United States Patent
Huang (10) Patent No.: US 10,871,316 B2
(45) Date of Patent: Dec. 22, 2020

(54) VALVE, EXPANSION VALVE, AND STEPPING CONTROL METHOD THEREOF

(71) Applicant: Chicony Power Technology Co., Ltd., New Taipei (TW)

(72) Inventor: Shih-Nan Huang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 89 days.

(21) Appl. No.: 16/151,700

(22) Filed: Oct. 4, 2018

(65) Prior Publication Data

US 2020/0041180 A1 Feb. 6, 2020

(30) Foreign Application Priority Data

Aug. 1, 2018 (TW) .............................. 107126760 A (51) Int. Cl.
F25B 41/06 (2006.01)

(52) U.S. Cl.
CPC .... *F25B 41/062* (2013.01); *F25B 2341/0653* (2013.01); *F25B 2347/00* (2013.01); *F25B 2400/01* (2013.01); *F25B 2500/04* (2013.01)

(58) Field of Classification Search
CPC ............ F16K 49/002; F25B 2341/0681; F25B 2341/0651; F25B 2341/0652; F25B 2341/0653; F25B 41/062
See application file for complete search history.

(56) References Cited

U.S. PATENT DOCUMENTS

| 3,399,543 | A | * | 9/1968 | Matthies | ............... | F25B 41/062 62/202 |
| 3,464,227 | A | * | 9/1969 | Matthies | ............... | F25B 41/062 62/225 |
| 3,967,781 | A | * | 7/1976 | Kunz | .................... | F25B 41/062 236/68 R |
| 4,239,177 | A | * | 12/1980 | Williams | ............... | F25B 41/062 236/101 B |
| 4,372,486 | A | * | 2/1983 | Tomioka | ............... | F25B 41/062 137/312 |
| 4,375,753 | A | * | 3/1983 | Imasu | .................... | F25B 13/00 236/68 B |

(Continued)

FOREIGN PATENT DOCUMENTS

| CN | 1161579 C | 8/2004 |
| CN | 2703169 Y | 6/2005 |

(Continued)

*Primary Examiner* — Nelson J Nieves
(74) *Attorney, Agent, or Firm* — Chun-Ming Shih; HDLS IPR Services (57) ABSTRACT

Disclosed is a valve, an expansion valve and their stepping control methods. The valve includes a valve body, a limiting unit, and a heating unit installed in the limiting unit. The valve body has an actuation space, and a first through hole and a second through hole communicated with the actuation space, and the actuation space further contains a valve seat disposed between the first and second through holes, and the limiting unit is installed in the actuation space, and a variable spacing is defined between the limiting unit and the valve seat. When the variable spacing is reduced, the heating unit heats up the interior of the limiting unit for heating to prevent ice buildups, so as to maintain a flowing state of the variable spacing.

14 Claims, 6 Drawing Sheets

(56) References Cited

U.S. PATENT DOCUMENTS

| | | | | |
|---|---|---|---|---|
| 4,653,283 | A | * | 3/1987 | Sepso ............... F25D 17/045 251/11 |
| 4,674,292 | A | * | 6/1987 | Ohya ............... F25B 41/062 62/223 |
| 4,787,213 | A | * | 11/1988 | Gras ............... G05D 16/2086 62/212 |
| 5,144,813 | A | * | 9/1992 | Orner ............... F25D 17/045 62/187 |
| 5,364,066 | A | * | 11/1994 | Dorste ............... F16K 1/38 251/122 |
| 5,915,410 | A | * | 6/1999 | Zajac ............... F16K 1/54 137/341 |
| 5,921,098 | A | * | 7/1999 | Schmidt ............... F25B 41/062 62/202 |
| 6,109,588 | A | * | 8/2000 | Cerrano ............... F25B 41/062 236/68 R |
| 6,321,780 | B1 | * | 11/2001 | Iwabuchi ............... F16K 31/04 137/341 |
| 6,430,950 | B1 | * | 8/2002 | Dienhart ............... B60H 1/00271 62/222 |
| 2003/0178064 | A1 | * | 9/2003 | Fukuda ............... F16K 49/002 137/341 |
| 2008/0053530 | A1 | * | 3/2008 | Knight ............... F16K 49/002 137/341 |
| 2008/0105843 | A1 | * | 5/2008 | Koenekamp ............ F16K 49/002 251/231 |
| 2009/0001299 | A1 | * | 1/2009 | Asanuma ............ F01M 13/0011 251/1.3 |
| 2010/0071781 | A1 | * | 3/2010 | Hatta ............... F16K 49/002 137/334 |
| 2010/0193717 | A1 | * | 8/2010 | Tanikawa ............... F16K 41/10 251/63.5 |
| 2014/0353391 | A1 | * | 12/2014 | Burklin ............... F25B 41/062 236/92 B |
| 2017/0002931 | A1 | * | 1/2017 | Shu ............... F16K 1/385 |
| 2018/0135776 | A1 | * | 5/2018 | Kim ............... F16K 41/10 |
| 2018/0195780 | A1 | | 7/2018 | Itou et al. |
| 2018/0202569 | A1 | | 7/2018 | Kawase et al. |
| 2018/0216506 | A1 | * | 8/2018 | Maas ............... F01M 13/00 |
| 2018/0306474 | A1 | * | 10/2018 | Uribe ............... F16K 31/002 |
| 2019/0277543 | A1 | * | 9/2019 | D'Souza ............... F25B 13/00 |
| 2019/0309872 | A1 | * | 10/2019 | Hauk ............... F01P 7/167 |
| 2019/0331244 | A1 | * | 10/2019 | Gregory ............... F16K 49/002 |

FOREIGN PATENT DOCUMENTS

| | | |
|---|---|---|
| CN | 101149118 B | 7/2011 |
| CN | 204493882 U | 7/2015 |
| CN | 205331589 U | 6/2016 |
| CN | 105822822 A | 8/2016 |
| CN | 206780877 U | 12/2017 |
| TW | 329459 B | 4/1998 |
| TW | M451239 U1 | 4/2013 |
| TW | M517327 U | 2/2016 |
| WO | 2017/141782 A1 | 8/2017 |

* cited by examiner

VALVE, EXPANSION VALVE, AND STEPPING CONTROL METHOD THEREOF

FIELD OF THE INVENTION

The present invention generally relates to valves, and more particularly to a valve, an expansion valve, and their stepping control methods used to overcome the problem of ice buildups.

BACKGROUND OF THE INVENTION

In general, a refrigerated air-conditioning system consists of e four major circulation components (including an expansion valve, an evaporator, a compressor and a condenser), and the expansion valve is used to control a central component with a cooling capacity. After a compressor compresses a refrigerant into its high-temperature high-pressure liquid state, the refrigerant is dried in a liquid storage tank, and a valve of the expansion valve is provided for controlling the flow of the refrigerant. In addition, the refrigerant is injected into a relatively large cavity to reduce temperature and pressure to form a low-temperature low-pressure wet vapor. Obviously, the control of the expansion valve plays an important role in both refrigeration and circulation processes.

However, when the expansion valve is operating a refrigeration control process under a relatively low room temperature, a gap between a valve pin and a valve seat in the expansion valve form is decreased to be substantially closed, and a maximum flow rate and a minimum static pressure are therefore caused here. Even tiny water molecules could be chilled extremely efficient in a low temperature environment of the extremely narrow gap and therefore froze to form ice crystals, Therefore, a throttle between the valve pin and the valve seat is choked by ice.

Since the expansion valve cannot be removed easily, the refrigerant needs to be refilled after leakage, so that the maintenance and repair process becomes very inconvenient. Without removing the expansion valve, the following conventional solutions are generally used:

1. Melt the ice by water. This method requires devices with a complicated structure which is difficult to make. Particularly, water could be accumulated in pipes if the details of the manufacture are not taken into account.

2. Melt the ice by electric heating. An electric heating device is installed outside the expansion valve, and the metal valve body is capable of conducting heat to melt the ice at the expansion valve. This method is power consuming, and a refrigeration circulation operating in the expansion valve would disturbed by a high-temperature environment created at the heated area. Therefore, it is necessary to shut down the operation of the system temporarily.

3. Melt the ice by steam. This method is quick and efficient, but users need an environmental condition of a boiler to produce steam.

4. Shutdown: The refrigeration system is shut down whenever there is an ice buildup, and then the refrigeration system is resumed after the ice is melted naturally.

In view of the aforementioned inconvenient solutions of ice buildup issue and the limitation of environmental conditions, the present invention provides a more convenient and efficient expansion valve structure to solve the issue of ice buildups in a refrigeration system, and such expansion valve structure is also applicable to a general valve.

SUMMARY OF THE INVENTION

It is a primary objective of the present invention to provide a valve, an expansion valve and a stepping control method thereof, characterized in that a heating device generating heat by electric power is installed inside a limiting unit such as a valve component, and a small area thereof could be thereby heated to melt ice when the limiting unit is precisely shifted to an appropriate position, so as to improve or even prevent ice buildup more efficiently with less power consumption.

To achieve the aforementioned objective, the present invention provides an expansion valve comprising a valve body, a driving unit, a transmission unit, a limiting unit, a control unit, and a heating unit installed in the limiting unit. The valve body is hollow and has an actuation space and a containing space, a first through hole and a second through hole communicated with the actuation space are defined on the valve body, and a valve seat is arranged in the actuation space and between the first and second through holes. The driving unit is installed in the containing space. The transmission unit is transmitted and linked with the driving unit in the containing space. The limiting unit is installed in the actuation space and linked by the transmission unit. The control unit is configured to control the driving unit, and the transmission unit is driven by the driving unit to shift the limiting unit in the actuation space relatively toward the valve seat.

To achieve the aforementioned and other objectives, the present invention provides a stepping control method of the aforementioned expansion valve, wherein the driving unit is a stepper motor for receiving a signal of the control unit to convert the signal into a number of revolution required by the stepper motor to adjust the relative shift of the limiting unit toward the valve seat, and the control unit activates the heating unit for heating when the limiting unit is shifted toward the valve seat to reach a predetermined distance or a predetermined position.

To achieve the aforementioned objectives, the present invention provides a valve having a valve body, a limiting unit, and a heating unit. The valve body is hollow and has an actuation space, a first through hole and a second through hole communicated with the actuation space is defined on the valve body, and a valve seat is disposed in the actuation space and between the first and second through holes. The limiting unit is installed in the actuation space, a variable spacing is defined between the limiting unit and the valve seat, and the heating unit is installed in the limiting unit. The variable spacing is reduced with the shifting of the limiting unit toward the valve seat in the actuation space, and the heating unit heats up the interior of the limiting unit to maintain the variable spacing to be passable.

DESCRIPTION OF THE PREFERRED EMBODIMENTS

The technical contents of the present invention will become apparent with the detailed description of preferred embodiments accompanied with the illustration of related drawings as follows. It is noteworthy that same numerals are used for representing same respective elements in the drawings.

Figure 1:
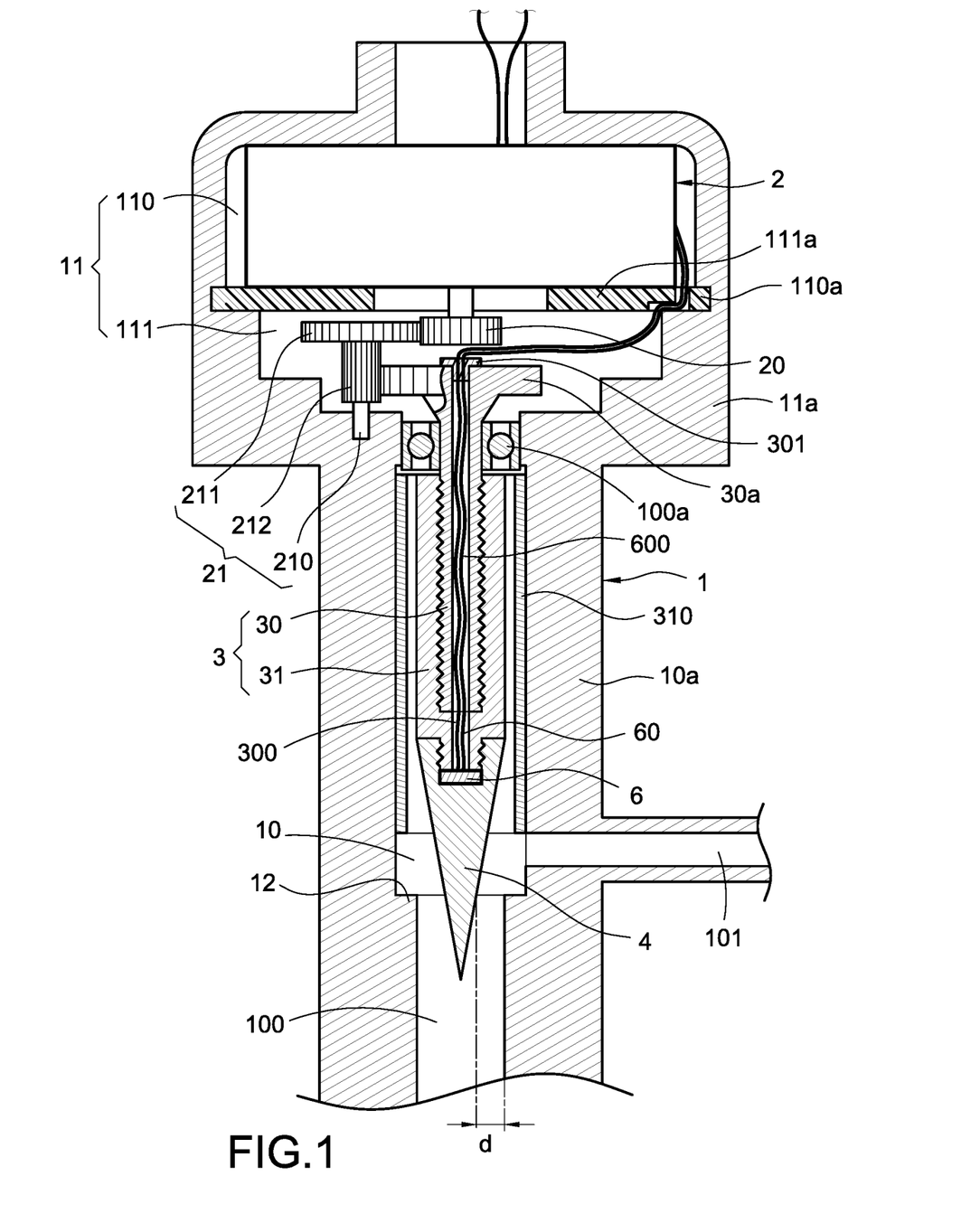
FIG. 1 is a schematic view of the internal structure of the present invention.

With reference to FIG. 1 for the internal structure of the present invention, the present invention provides a valve, an expansion valve and their stepping control method applicable to a general valve and particularly applicable to an expansion valve of a refrigerated air-conditioning system for improving or preventing ice buildups phenomenon. The expansion valve comprises a valve body 1, a driving unit 2, a transmission unit 3, a limiting unit 4, a control unit 5, and a heating unit 6.

The valve body 1 is hollow and an actuation space 10 and a containing space 11 are defined therein. According to the embodiment of the present invention, the valve body 1 has a lower valve body 10a and an upper valve body 11a, the actuation space 10 is formed in the lower valve body 10a, and the containing space 11 is formed in the upper valve body 11a. The containing space 11 is divided into a first space 110 and a second space 111. The driving unit 2 is installed in the first space 110. The transmission unit 3 is installed in the second space 111 and extended into the actuation space 10. In addition, the limiting unit 4 could be a valve component, and is specifically a valve pin in the expansion valve. Corresponding to various types of valves, the expansion valve alternatively could be a valve ball or another valve component for controlling flux. In general, the limiting unit 4 is installed in the actuation space 10 and driven by the transmission unit 3, so that the limiting unit 4 is allowed to shift in the actuation space 10.

Furthermore, in an embodiment shown in FIG. 1, a latching structure 110a is disposed between the first spaces 110 and the second spaces 111, wherein the latching structure 110a could be a ring installed in a groove at an inner wall of the containing space 11, and the driving unit 2 is latched with the latching structure 110a through a partition 111a. In other words, an outer edge of the partition 111a is embedded into the groove to fix the driving unit 2 on the partition 111a into the first space 110. The driving unit 2 could have a drive gear 20, and the driving unit 2 is extended into the second space 111 through the partition 111a and thereby engaged with the transmission unit 3 or engaged with the transmission unit 3 further via a retardation unit 21.

The aforementioned transmission unit 3 could include a screw 30 and a screw sleeve 31, the screw sleeve 31 is disposed in the actuation space 10 and connected to the limiting unit 4, and the screw 30 is extended into the screw sleeve 31 from the second space 111 of the containing space 11 toward the limiting unit 4 and thereby engaged with the screw sleeve 31. Therefore, the driving unit 2 can be engaged with the screw 30 via the drive gear 20. Furthermore, the screw 30 could have a transmission gear 30a, and the drive gear 2 is engaged with the transmission gear 30a to transmit. In an embodiment of the present invention, the retardation unit 21 could be further installed between the driving unit 2 and the transmission unit 3 according to required transmission speed. The retardation unit 21 includes a rotating shaft 210 and a first drive wheel 211 and a second drive wheel 212 installed on the rotating shaft 210. The drive gear 20 and the transmission gear 30a are respectively engaged with the first drive wheel 211 and the second drive wheel 212 and retarded by a tooth ratio of the first drive wheel 211 and the second drive wheel 212, so as to control the shifting of the limiting unit 4 in the actuation space 10 more precisely.

In the embodiment, specifically, a support element 100a could be further arranged in the valve body 1, and in particular in the actuation space 10 of the valve body 1. The support element 100a could be a bearing, and the screw 30 is limited in the actuation space 10 of the valve body 1 via the support element 100a, so as to maintain the rotation of the screw 30 when driven by the driving unit 2. A protective layer 310 could be further arranged between the screw sleeve 31 and an inner wall of the actuation space 10 to reduce wear therebetween. In addition, the screw 30 has a wire hole 300 extended along an axial direction of the screw 30, and the wire hole 300 is communicated with an interior of the limiting unit 4. In the present invention, the heating unit 6 is installed in the limiting unit 4, and the heating unit 6 could be electrically connected to outside by an electrical connection such as a wire 60, and the wire 60 is extended from the interior of the limiting unit 4 through the wire hole 300 to electrically connected with the control unit 5.

Figure 2:
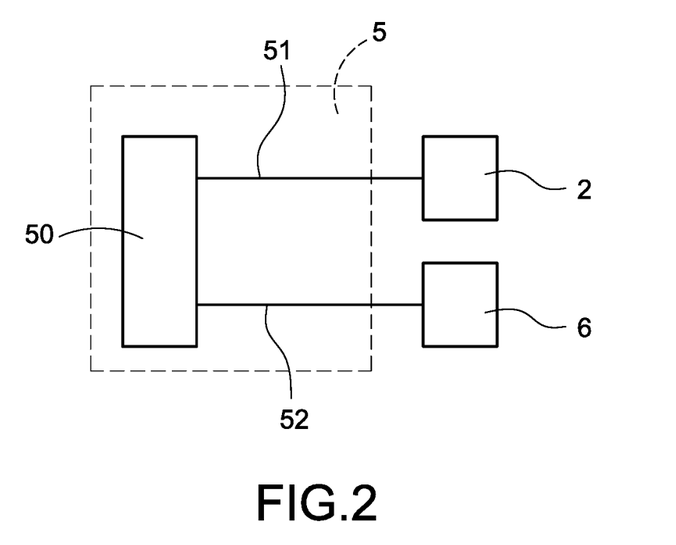
FIG. 2 is a schematic circuit block diagram of a control unit of the present invention.

With reference to FIG. 2 for a schematic circuit block diagram of a control unit 5 of the present invention, the control unit 5 is an external electronic device electrically connected to the valve body 1. However, the present invention is not limited to such arrangement only. The control unit 5 could include a control chip 50 electrically connected to the driving unit 2 and the heating unit 6 through a first circuit 51 and a second circuit 52. The driving unit 2 is controlled by the control unit 5 through the first circuit 51 to drive the transmission unit 3 to shift the limiting unit 4 in the actuation space 10, and the heating unit 6 is meanwhile activated through the second circuit 52 electrically connected with the wire 60 to heat the interior of the limiting unit 4 when the limiting unit 4 is shifted to an appropriate position.

Figure 3:
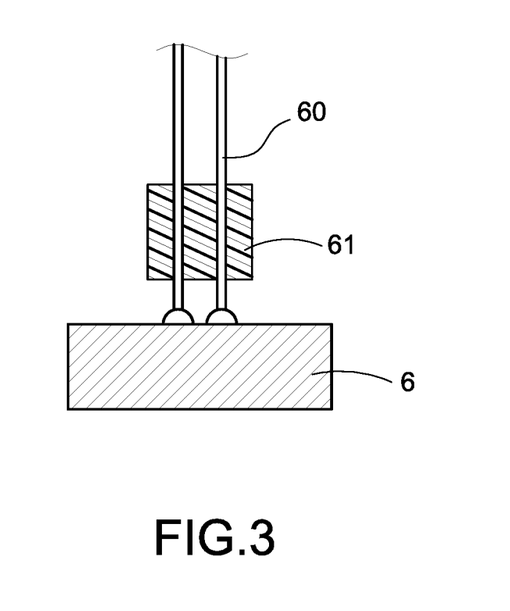
FIG. 3 is a partial blowup view of a heating unit of the present invention.
Figure 4:
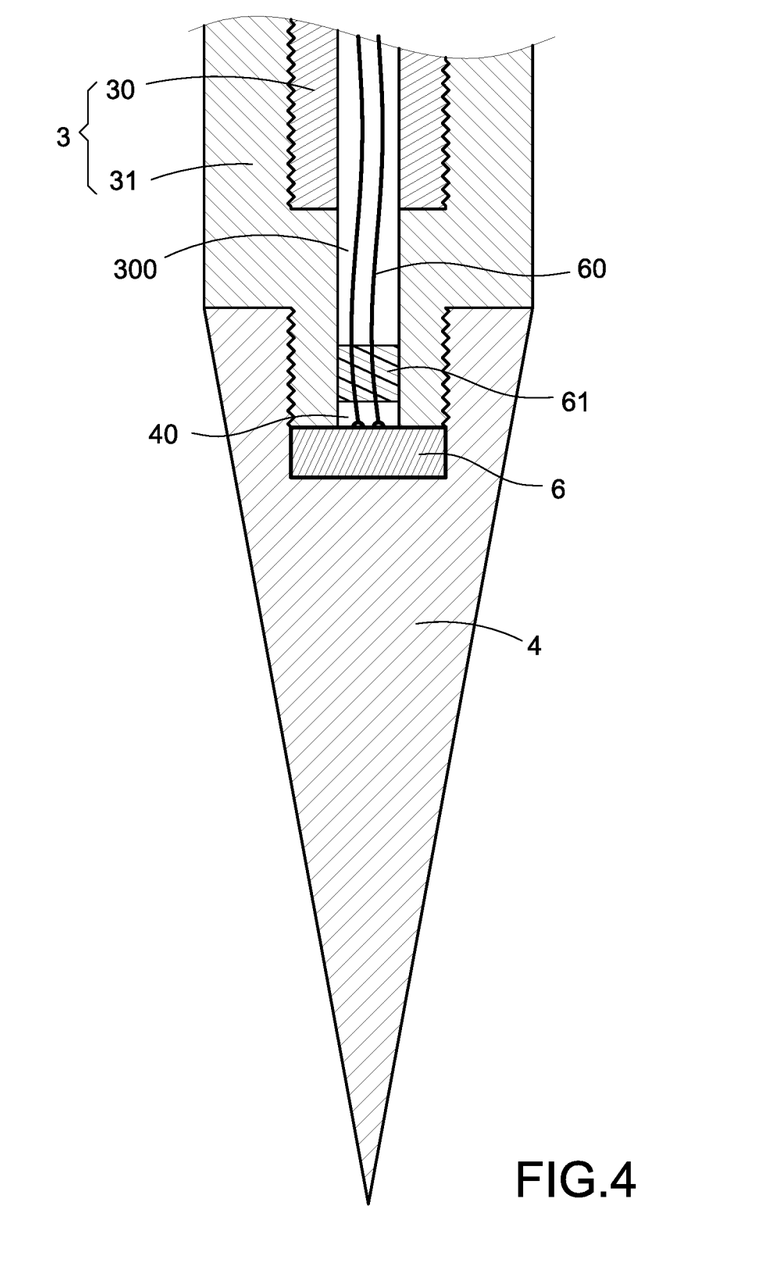
FIG. 4 is a partial blowup view of a limiting unit of the present invention.
Figure 5:
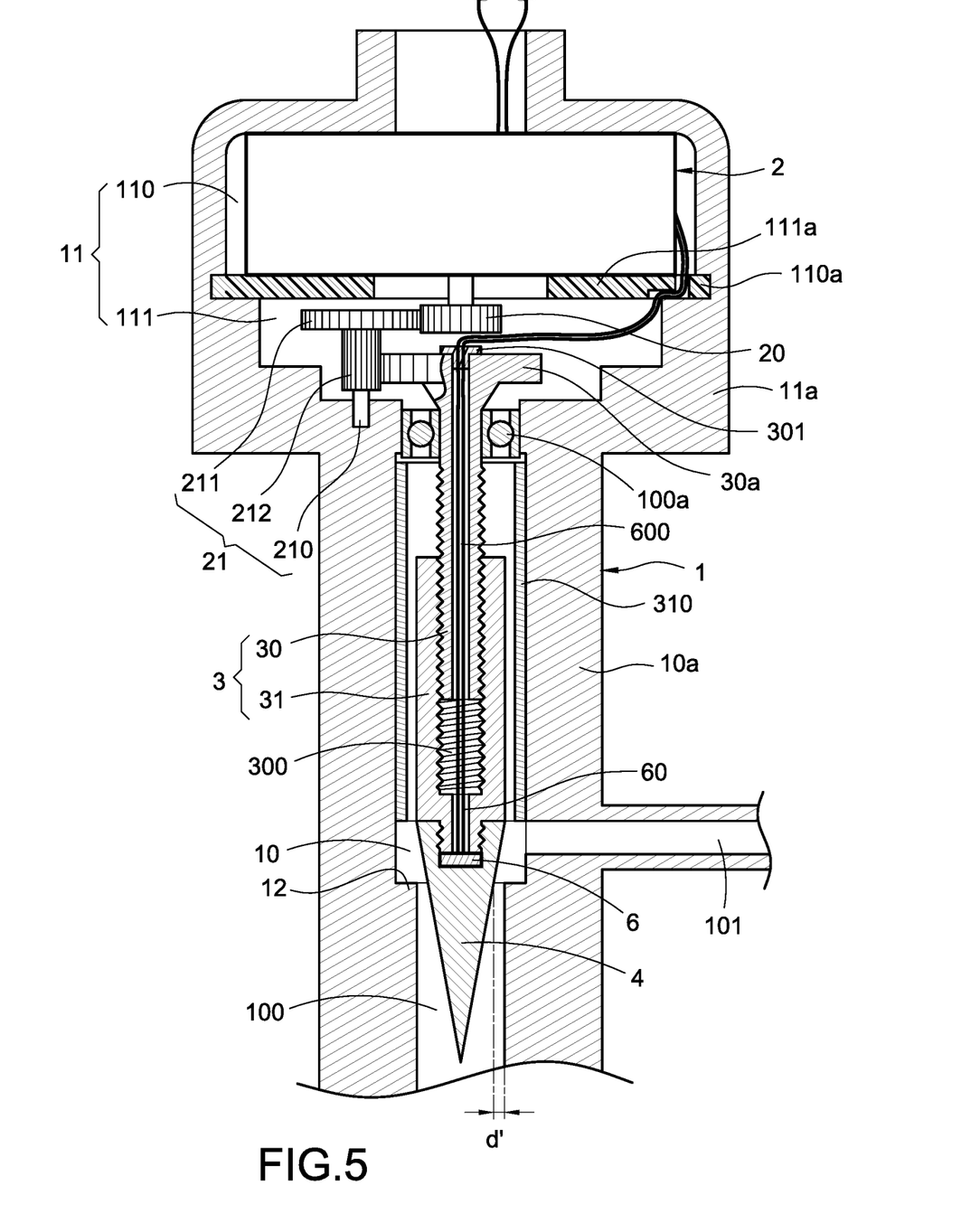
FIG. 5 is a schematic view of the operation of the present invention.

According to FIGS. 3, 4 and 5, specifically, the limiting unit 4 has a recessed space 40 for accommodating the heating unit 6, and the wire hole 300 of the screw 30 is communicated with the recessed space 40, so that the wire 60 can be extended into the recessed space 40 through the wire hole 300 and electrically connected to the heating unit 6. In FIG. 3, the wire 60 has a protective tube 61 disposed adjacent to the junction of the heating unit 6 to improve the connection between the wire 60 and the heating unit 6. In an embodiment shown in FIG. 4, the heating unit 6 could be embedded into the recessed space 40, and the protective tube 61 is fixed to the recessed space 40 to prevent the wire 60 from twisting or breaking at the junction or a position near the junction of the wire 60 and the heating unit 6 when the transmission unit 3 is rotated. In FIGS. 1 and 5, the screw 30 of the transmission unit 3 has a sealing plug 301 installed to an end of the wire hole 300, and the sealing plug 301 covers the exterior of the wire 60 to prevent the heating unit 6 from interferences caused by a refrigerant (not shown in the figure) leaking into the wire hole 300 from the actuation space 10. In addition, a curved section 600 (as shown in FIG. 1) is reserved on the wire 60 between the heating unit 6 and the sealing plug 301, and the curved section 600 has an length longer than a distance between the heating unit 6 and the sealing plug 301, so that when the limiting unit 4 shifts downward in the actuation space 10 as shown in FIG. 5, a sufficient extending length is provided (or the curved section 600 is pulled straight as shown in FIG. 5) to maintain the electrical connection between the control unit 5 and the heating unit 6.

In FIGS. 1 and 5, the valve body 1 has a first through hole 100 and a second through hole 101 formed on the lower valve body 10a thereof and the first through hole 100 and the second through hole 101 are respectively communicated with the actuation space 10. A valve seat 12 is installed in the actuation space 10 and between the first through hole 100 and the second through hole 101. The valve seat 12 is disposed precisely at an end of the actuation space 10 and a variable spacing d is defined between the limiting unit 4 and the valve seat 12. When the limiting unit 4 is driven to shift in the actuation space 10 by the driving unit 2 and the transmission unit 3, the limiting unit 4 can be shifted relatively toward the valve seat 12 or away from the valve seat 12 to change the size of the variable spacing d, so as to adjust or control the flow. In FIG. 5, the limiting unit 4 is shifted toward the valve seat 12 to reduce the variable spacing d'. In FIG. 1, the limiting unit 4 is shifted away from the valve seat 12 to increase the variable spacing d.

In FIG. 5, the limiting unit 4 is shifted toward the valve seat 12. In other words, the variable spacing d' is reduced, and the heating unit 6 will be activated at an appropriate time to heat up the interior of the limiting unit 4, so as to prevent ice buildups and maintain the variable spacing d' to be passable. Further, the present invention provides a stepping control method of an expansion valve, wherein the driving unit 2 is a stepper motor, and the control unit 5 converts a received signal of the environmental detection into the number of revolutions required by the stepper motor, so as to drive the stepper motor and adjust the relative shifting of the limiting unit 4 toward the valve seat 12. The control unit 5 can calculate the distance of the variable spacing d' according to the number of revolutions of the stepper motor. When the limiting unit 4 is shifted toward the valve seat 12 to reach a predetermined distance or a predetermined position, or the variable spacing d is adjusted a predetermined distance or to a predetermined position, the control unit 5 actives the heating unit 6 to heat up the limiting unit 4.

In other feasible embodiments, the driving unit 2 could be a differential pressure structure (not shown in the figure) provided for receiving a differential pressure signal to adjust the variable spacing d; or the driving unit 2 could be a knob (not shown in the figure) manually turned to adjust the variable spacing d. Therefore, the shifting of the limiting unit 4 can be controlled to adjust the variable spacing d and activate the heating unit 6 at the right time.

Figure 6:
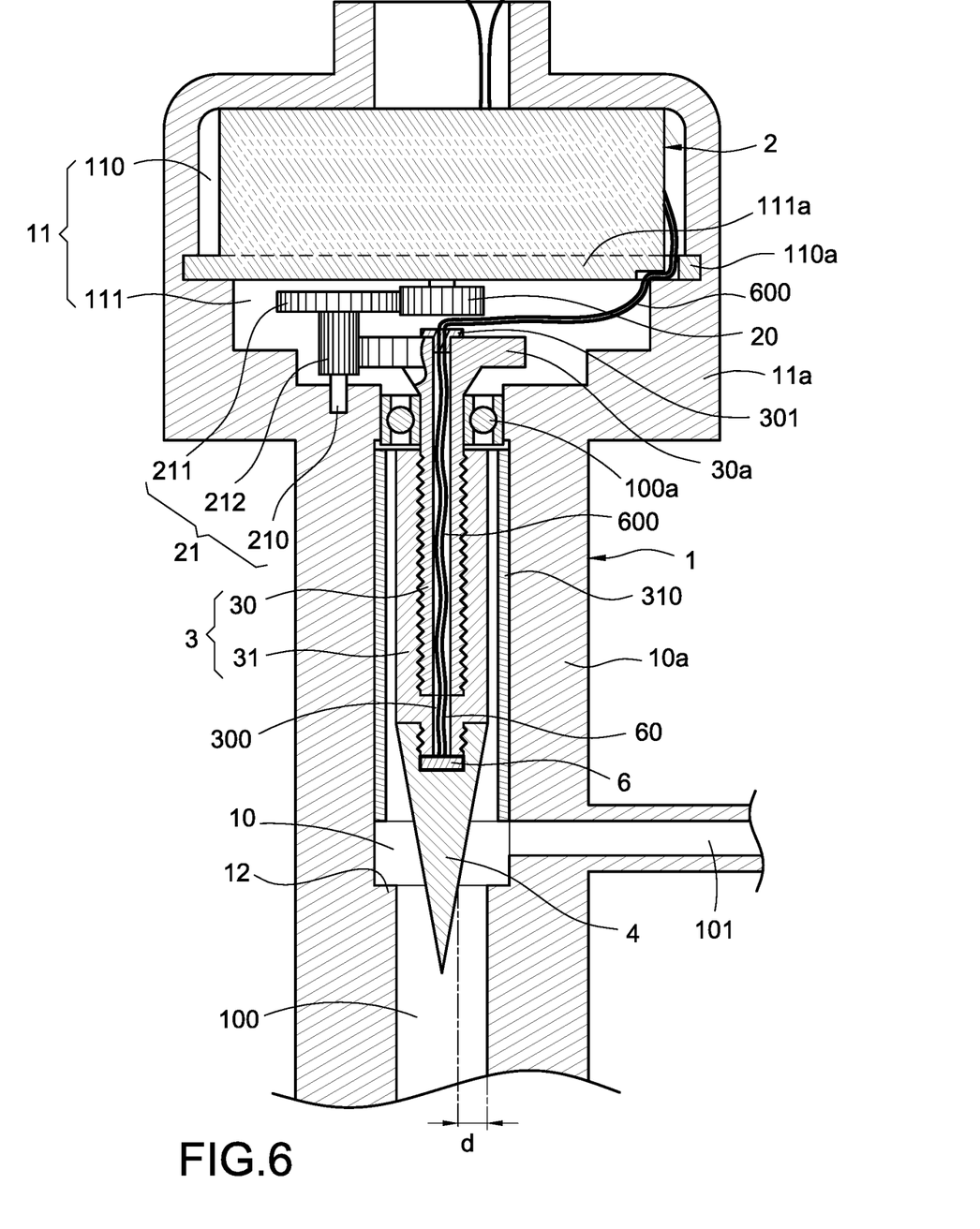
FIG. 6 is a schematic view of the internal structure of another embodiment of the present invention.
Figure 7:
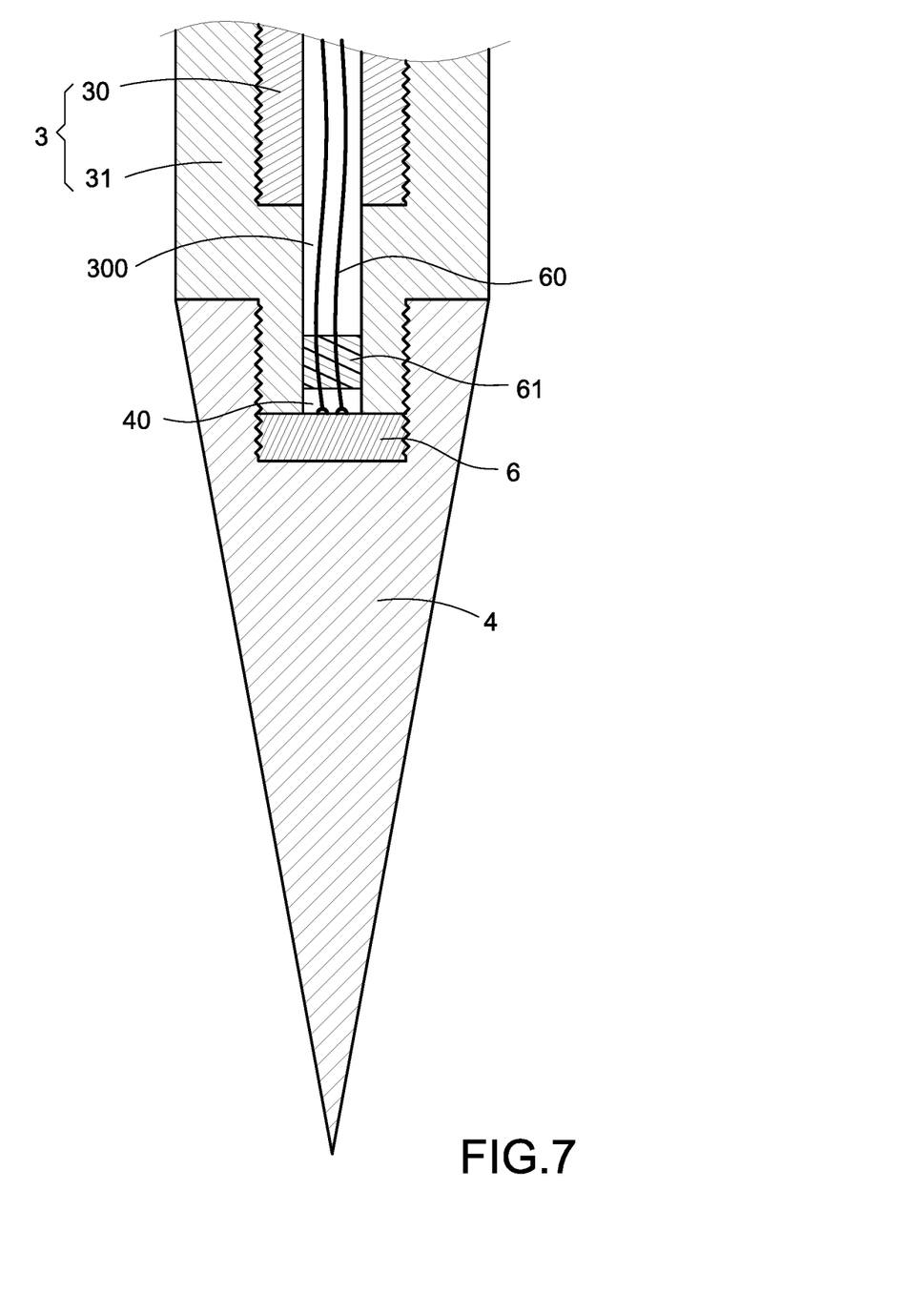
FIG. 7 is a partial blowup view of a limiting unit in accordance with another embodiment of the present invention.

In another embodiment of the present invention as shown in FIG. 6, the driving unit 2 is directly latched with the latching structure 110a and thereby disposed in the first space 110, so that the bottom of the driving unit 2 directly faces toward the second space 111, and the drive gear 20 is also extended from the bottom to the second space 111 and engaged with the transmission unit 3, and further engaged with the drive wheel 211 of the retardation unit 21. In FIG. 7, the heating unit 6 could be assembled into the recessed space 40 through a screw thread. Such screwing method not just achieves a high stability of assembling the heating unit 6 into the limiting unit 4 only, but also adjusts or corrects the position more precisely afterward, so as to calculate the distance between the heating unit 6 and the valve seat 12 and control the timing of activating the heating unit 6.

With the aforementioned structural assembly, the valve, expansion valve and their stepping control methods of the present invention are achieved.

The valve, expansion valve and their stepping control methods adopt the design of the heating unit 6 installed inside the valve pin or the limiting unit 4 has the following advantages:

(1) Users could perform troubleshooting without disassembling the valve or expansion valve.

(2) Compared with the conventional heating method of the valve body, the present invention can heat up the ice buildup position more precisely to achieve the effects of reducing power consumption and melting the ice more efficiently.

(3) Compared with the conventional heating method of the valve body that could cause interference to the flowing environment or have an earlier phase change of the refrigerant, the present invention focuses on the heating at the position of the valve pin only, and thus will not cause interference to the flowing environment easily.

(4) The wire 60 of the power supply is integrated into a control connector of the driving unit 2 without adding additional connectors or changing the design of the expansion valve.

In summation of the description above, the present invention achieves the expected objectives and overcomes the drawbacks of the prior art, and the invention complies with patent application requirements, and is thus duly filed for patent application.

While the invention has been described by means of specific embodiments, numerous modifications and variations could be made thereto by those skilled in the art without departing from the scope and spirit of the invention set forth in the claims.

What is claimed is:

1. An expansion valve, comprising:
   a valve body, is hollow and has an actuation space and a containing space, a first through hole and a second through hole are respectively communicated with the actuation space being defined on the valve body, and a valve seat being arranged in the actuation space and between the first through hole and the second through hole;
   a driver, installed in the containing space;
   a valve stem, installed in the containing space and transmissively connected to the driver;
   a limiting valve, installed in the actuation space and driven by valve stem, wherein the limiting valve has a recessed space formed therein;
   a controller, configured to control the driver, and valve stem is driven by the driver to shift the limiting valve in the actuation space relatively toward the valve seat; and
   a heating piece, installed in the recessed space of the limiting valve;
   wherein the valve stem includes a screw and a screw sleeve, the screw sleeve is disposed in the actuation space and connected to the limiting valve, the screw is extended from the containing space toward the limiting valve into the screw sleeve and engaged with the screw sleeve;
   wherein the screw has a wire hole extending along the axial direction thereof, the heating piece is electrically connected to a wire, and the wire is electrically connected to the controller through the wire hole;
   wherein the screw has a sealing plug disposed at an end of the wire hole and the wire is surrounded the sealing plug.

2. The expansion valve of claim 1, wherein the containing space is divided into a first space and a second space, the driver is disposed in the first space, and the valve stem is disposed in the second space.

3. The expansion valve of claim 2, further comprising a partition installed between the first space and the second space, and the driver is installed on the partition and thereby fixed in the first space.

4. The expansion valve of claim 1, wherein the driver has a drive gear engaged with the valve stem.

5. The expansion valve of claim 4, further comprising a retarder installed between the driver and the valve stem.

6. The expansion valve of claim 1, wherein the valve body has a support element, and the support element comprises a through hole; and the screw passes through the through hole and is limited inside the valve body by the support element.

7. The expansion valve of claim 6, wherein the support element is a bearing.

8. The expansion valve of claim 1, further comprising a protective layer disposed between the screw sleeve and an inner wall of the actuation space.

9. The expansion valve of claim 1, wherein the wire has a curved section between the heating piece to the controller.

10. The expansion valve of claim 1, further comprises a variable spacing disposed between the limiting valve and the valve seat and driven by the valve stem for adjustment, and the heating piece heats up the interior of the limiting valve to maintain the variable spacing to be passable.

11. The valve of claim 10, wherein the driver is a stepper motor which receives a control signal to adjust the variable spacing.

12. The valve of claim 10, wherein the driver is a differential pressure structure which receives a differential pressure signal to adjust the variable spacing.

13. The valve of claim 10, wherein the driver is a knob structure which is turned manually to adjust the variable spacing.

14. The expansion valve of claim 1, wherein the wire has a protective tube disposed adjacent to the junction of the heating piece.

* * * * *